(12) United States Patent
Robinson et al.

(10) Patent No.: US 7,018,320 B2
(45) Date of Patent: Mar. 28, 2006

(54) ROLLER CONTROL UNIT

(75) Inventors: Leslie Kendrick Robinson, Preston (GB); Ian David Cornwell, Preston (GB); Brian Joseph Dutson, Manchester (GB)

(73) Assignee: Torotrak (Development) Limited, (GB)

( * ) Notice: Subject to any disclaimer, the term of this patent is extended or adjusted under 35 U.S.C. 154(b) by 268 days.

(21) Appl. No.: 10/432,975

(22) PCT Filed: Nov. 29, 2001

(86) PCT No.: PCT/GB01/05274

§ 371 (c)(1),
(2), (4) Date: May 29, 2003

(87) PCT Pub. No.: WO02/44587

PCT Pub. Date: Jun. 6, 2002

(65) Prior Publication Data

US 2004/0038773 A1    Feb. 26, 2004

(30) Foreign Application Priority Data

Nov. 29, 2000  (EP)  .................................. 00310556
Nov. 29, 2000  (GB)  .................................. 0029131

(51) Int. Cl.
*F16H 15/38*    (2006.01)
(52) U.S. Cl. ............................. 476/40; 476/10; 92/187
(58) Field of Classification Search ................. 476/40, 476/42, 46, 2, 10; 92/157, 179, 187
See application file for complete search history.

(56) References Cited

U.S. PATENT DOCUMENTS 3,802,284 A    4/1974    Sharpe et al.

FOREIGN PATENT DOCUMENTS

| EP | 0 882 910 A2 | 2/1999 |
| GB | 1 392 707 | 4/1975 |
| GB | 2 336 879 | * 3/1999 |
| WO | WO 94/01697 A1 | 1/1994 |

* cited by examiner

*Primary Examiner*—William C. Joyce
(74) *Attorney, Agent, or Firm*—Brooks Kushman P.C.

(57) ABSTRACT

A control unit for an infinitely-variable-ratio transmission. The transmission includes a cylinder and a piston with a proximal and a distal end. A support stem is connected to the piston. The piston is hollow and has a head portion for interaction with an associated actuation fluid. A proximal portion extends away from the head portion. The support stem is connected to the proximal portion by an articulated joint and extends from the joint to the head portion to exit from the distal end of the piston.

16 Claims, 2 Drawing Sheets

ROLLER CONTROL UNIT

BACKGROUND OF THE INVENTION

1. Field of the Invention

The present invention relates to a control unit suitable for facilitating movement of an object connected thereto between desired positions and relates particularly, but not exclusively, to a control unit in the form of an hydraulically operated piston operably connectable to a roller mechanism in an infinitely-variable-transmission (IVT) or the like. The invention also relates to an IVT incorporating said control unit.

2. Background Art

Several patent publications of recent years, of which WO90/05860 is an example, describe infinitely-variable-transmissions in which direct connection of each roller to a piston subjected to controlled hydraulic pressure suffices to maintain the angular orientation of each roller—and thus the ratio transmitted by it from an input disc to an output disc—at the appropriate value at all times. The key to the efficacy of such an apparently simple method of roller control is that the torque transmitted by the variator can be controlled by adjustment of the hydraulic pressure. A control system receives inputs representative of all the essential parameters, and sets up within the cylinder the appropriate hydraulic pressure to match the torque reaction associated with the desired orientation, so causing the roller to seek and hold that orientation.

One of the problems encountered in practice by IVTs in which rollers are controlled is that the length of the stroke that the piston must execute in order fully to control the roller is relatively long. Consequently, the housing for the piston/cylinder is of such length that it can be difficult to install within the tight confines of some engine or transmission compartments.

A solution to the above-mentioned problem is presented in WO 99/54646 in which there is described a roller control unit for a continuously-variable-ratio transmission of the toroidal—race roller traction type, in which the unit comprises a piston/cylinder arrangement characterised by telescopic shrouds of variable length extending between the piston and the end wall. The shrouds act to define, in combination with the piston and cylinder, a chamber for receiving hydraulic actuation fluid and translate between deployed and retracted positions as and when the piston moves. The provision of telescopic shrouds facilitates a reduction in the axial length of the actuation mechanism which is of significant benefit when installing in the tight confines of some engine or transmission compartments.

SUMMARY OF THE INVENTION

It is an object of the present invention to provide an alternative control unit which also lends itself to use in confined spaces and which is more easily assembled than some prior arrangements. It is an additional object of the present invention to provide a control unit in the form of an hydraulically operated piston operably connectable to a roller mechanism. It is a still further object of the present invention to provide an infinitely-variable-transmission or the like with a control unit as described herein.

Accordingly, the present invention provides a control unit for an infinitely-variable-ratio transmission comprising a cylinder, a piston, having a proximal end and a distal end, and a support stem connected to said piston, said piston being hollow and having a head portion for interaction with associated actuation fluid and a proximal portion extending away from said head portion, characterised in that said support stem is connected to said proximal portion of said piston by means of an articulated joint and extends from said joint through said head portion to exit from said distal end of said piston.

The present invention also provides an infinitely-variable-transmission having such a control unit.

BRIEF DESCRIPTION OF THE DRAWINGS

A specific embodiment of the present invention will now be described, by way of example only, with reference to the accompanying drawings, in which.

DETAILED DESCRIPTION OF THE PREFERRED EMBODIMENTS

Figure 1:
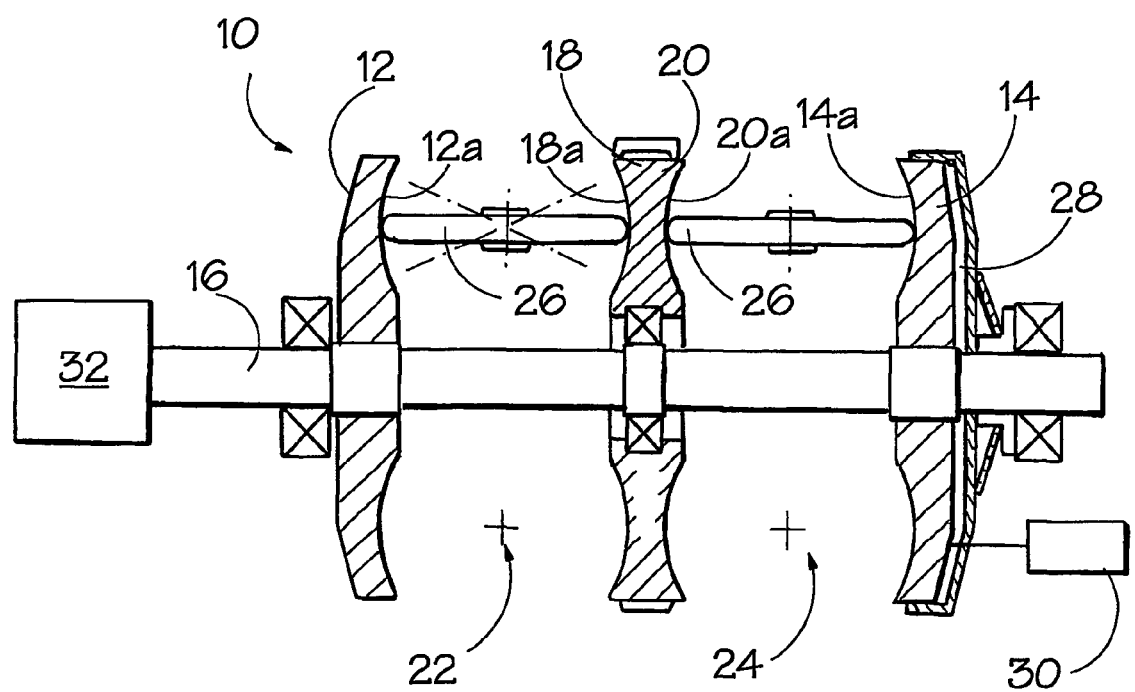
FIG. 1 is a schematic representation of an infinitely-variable-transmission of known type.

Referring now to FIG. 1, an infinitely-variable-transmission is shown generally at 10 and comprises a pair of outer discs 12, 14 connected to a central shaft 16 for rotation therewith and a pair of inner discs 18, 20 supported on but rotatable relative to shaft 16. Each of the confronting faces 12a, 14a, 18a, 20a of the discs 12, 14, 18, 20 is profiled such as to define between respective confronting surfaces a pair of toroidal cavities shown at 22, 24. A plurality of hydraulically actuated rollers 26 are circumferentially spaced around each cavity and positioned such as to contact each associated confronting surface in a manner that facilitates the transmission of motion between associated discs through the rollers. An end load mechanism shown in the form of an hydraulic chamber arrangement 28 and associated hydraulic fluid source shown schematically at 30 are provided to urge the various discs together in a manner well known in the art and therefore not described herein. Also shown in FIG. 1 is an engine 32 or other prime mover for driving shaft 16 directly (as shown) or discs 18, 20 by means of a parallel shafting arrangement and transfer mechanism well known in the art and therefore not shown herein for reasons of clarity. The rollers 26 are each actuated in the manner described above with reference to WO 90/05860 by control units best seen in FIG. 2.

Figure 2:
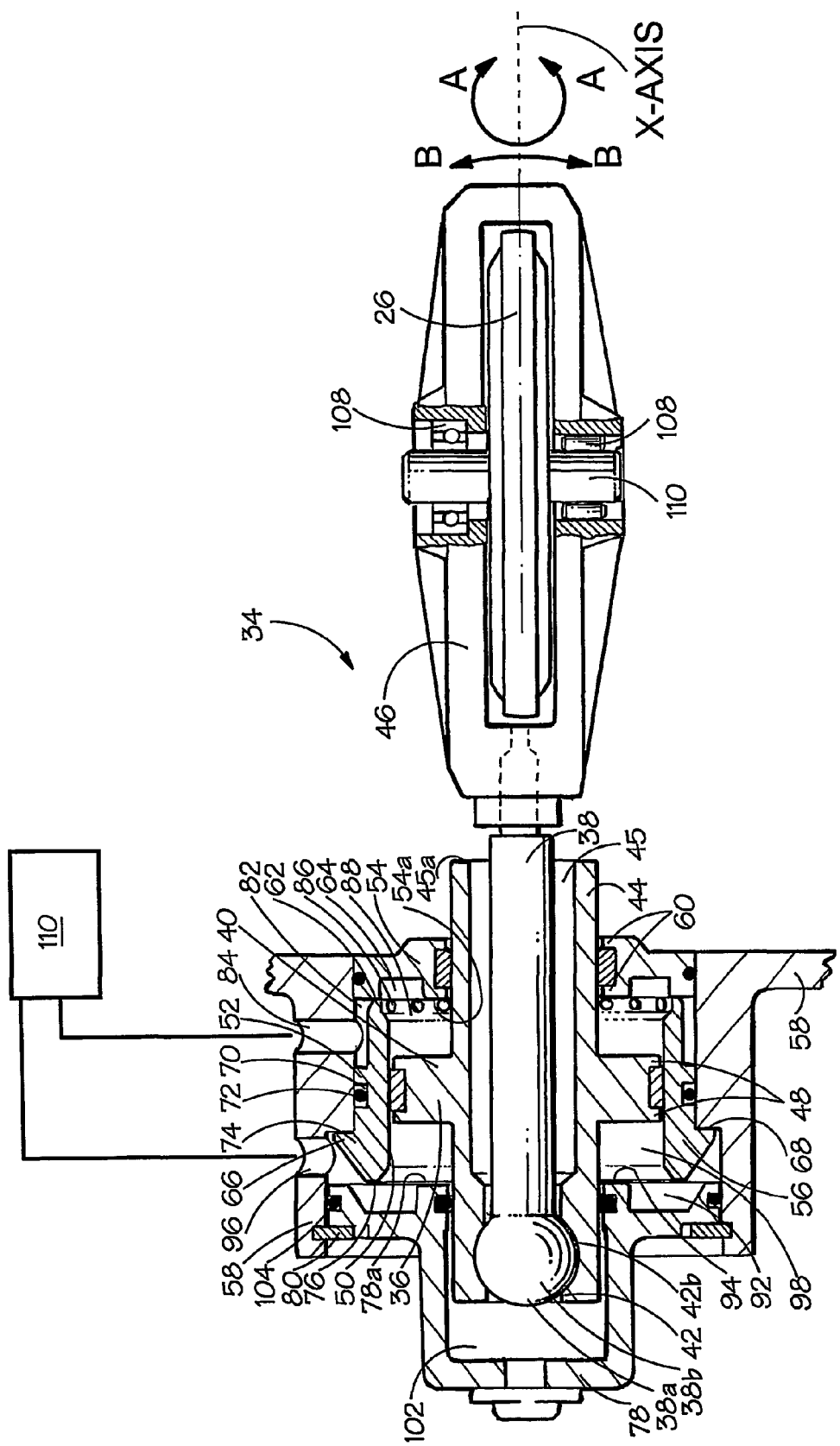
FIG. 2 is a cross-sectional view of a control unit embodying the present invention.

Referring now to the drawings in general but particularly to FIG. 2, a control unit 34 suitable for facilitating management of an object—such as a roller 26 of an IVT—between desired position includes an axially displaceable piston 36 and roller support stem 38. As shown, the piston itself comprises a head portion 40 and first and second axial portions 42, 44 of slimmer profile than head 40 and which extend in opposite directions to each other from said head portion 40. The free end of portion 42 forms a proximal end of the piston 36 and is shaped to receive a proximal end 38a of the roller support stem 38 which is itself suitably shaped for being received by the proximal end of the piston 36. In this particular arrangement the stem 38 is provided with a spherical ball portion 38b shaped for being received by a complimentary internally spherical portion 42b on portion 42. Such spherical joints are well known in the art and may be formed by simply swaging (deforming) the concave portion around the ball portion 38b and thereby capturing said ball portion within portion 42. The spherical jointing allows the stem 38 to move laterally in the direction of, for example, arrows B—B. The roller must also be capable of rotation in the direction of arrows A—A. In the present embodiment this facility is provided by virtue of the piston 36 being free to rotate about its axis. Whilst the operation will be described in more detail later herein, it will be appreciated that simpler jointing arrangements can be employed if just one or other of the two motions is desired. For example, a simple pinned joint would facilitate motion in the direction of arrows B—B only. Other arrangements will present themselves to a person skilled in the art.

Further features of the control unit 34 include an internal bore 45 within the piston 36 through which the stem 38 extends towards a roller support head 46. The sizes of the bore 44 and the stem 38 are selected so as to allow the desired degree of stem/roller motion without interference between the two components. If necessary, the outlet end 45a of bore 45 may be internally relieved to allow more clearance. The head portion 40 is provided with sealing lands 48 for sealing against an inner surface 50 of an outer ring 52. Outer ring, or cylinder liner, 52 comprises radially and axially extending portions 54, 56 respectively and is shaped to fit within a complimentary hole in a casing portion 58 which may be the casing of the IVT itself Portion 54 is provided with sealing lands 60 which seal against portion 44 and a sealing ring 62 which seals its radially outer edge within the hole in casing 58. Also provided in portion 54 is a recess 64 which may be formed by segments of a circle or an entire circle, the function of which will be explained later herein. The radially extending portion is also provided with a number of features, the first of which is a circumferentially extending step portion 66 which engages with a corresponding step portion 68 formed in casing 58. Between them the two step portions 66, 68 act to locate the ring or cylinder liner 52 in the desired axial location relative to the casing 58. Additionally, the ring 52 is provided with an external groove 70 and associated seal 72 for sealing the outer side of the ring relative to the casing 58. The reasons for this seal will become apparent later herein. A first end of the ring 52 is provided with a tapered portion 74 having a tip 76 for engagement up against an end-cap 78 which is also sealably secured to the casing by means of a circlip 80 or some such device. The other end of portion 52 is provided with a circumferentially extending recess or channel 82 for receiving hydraulic actuation fluid from an inlet 84 provided in casing 58. The recess 82 extends axially and is provided at one end with a plurality of radially extending holes 86 which connect said channel with first piston chamber 88 formed within the control unit itself As shown, the holes 86 extend into a region of chamber 88 which is radially outward of the external surface of piston head 40 and fluidly connected to recess 64. The end-cap 78 is also provided with a circumferentially extending recess 92 but this only extends through part of the circumference such that the tip 76 of portion 52 contacts at least a portion of the surface 94 provided on the end-cap 78. As shown, the recess 92 bridges tip 76 such that hydraulic actuation fluid supplied via inlet 96 passes around tip 76, into recess 92 and thence into annular chamber 98 within the actuation control unit itself. The end-cap 78 receives portion 42 into a suitably sized cavity 102 provided therein. This cavity may be provided with a fluid drain to ensure fluid therein may be displaced during piston motion. Again, a suitable ring seal 104 is provided between the end-cap 78 and portion 42. Further components of the FIG. 2 embodiment include a roller support carriage 46 mounted on the support stem 38 in which is mounted a roller 26 which is itself freely rotatably therein by means of bearings 108 and shaft 110.

Assembly of the above-mentioned arrangement simply requires the insertion of portions 52, 54 into a suitably shaped and positioned hole within the casing 58 such that the two step portions 66, 68 engage and define the axial positions of portion 52. Piston 34 is then assembled within liner portion 52 by passing portion 44 through the hole defined by sealing land 60 such that it protrudes through the other side thereof. The roller head portion 46 may then be securely attached to stem 38 by bolting or any other such suitable means before end cap 78 is introduced over the otherwise free end 42 of piston 40. As described above, end cap 78 is provided with a surface which engages with the tip 76 of portion 52 such as to define the axial portion of end cap 78. Once in position, end cap 78 is secured within the hole by means of circlips 80 and the assembly process is complete. Disassembly simply requires the reversal of the above-mentioned assembly process.

In operation, hydraulic roller control fluid is applied at different pressures to inlets 84, 96 by means of a differential pressure control device shown schematically at 110. The fluid from inlet 84 passes into annular chamber 82 before entering holes 86 and passing into chamber 88. Fluid entering inlet 96 deviates past tip 76 and into recess 92 before entering annular chamber 98. Depending upon the pressures within chambers 88, 98 the piston will either remain stationary or move in accordance with the change in pressure so as to alter the position of roller 26. The seals discussed above act to ensure the hydraulic integrity of chambers 88, 98.

It will be appreciated that the inventive feature of the above arrangement may be used in a "single acting" piston, that is to say a piston having but one actuation chamber 88, 98. In such an arrangement (not shown) one would simply delete chamber 89 and portion 44 such that actuation is achieved by input of fluid to chamber 98 only. A spring may be used to offer a return assistance against the action of the hydraulic fluid should that prove desirable.

It will also be appreciated that, whilst the above arrangement has been described with specific reference to IVTs the actuation mechanism of the control unit may be employed in a number of different situations such as, for example, the operation of robot arms or manipulator devices.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A control unit for an infinitely-variable-ratio transmission comprising a cylinder located in the infinitely-variable-ratio transmission, a piston having a proximal end and a distal end, and a support stem connected to said piston, said piston being hollow and having a head portion for interaction with associated actuation fluid, said head portion having a proximal end face which defines a chamber within the cylinder and is exposed to actuation fluid in the chamber, such that actuation fluid pressure within the chamber tends to cause said piston to move, and a proximal portion extending away from said proximal end face of said head portion, said support stem being connected to said proximal portion of said piston by an articulated joint and extending from said joint through said head portion to exit from said distal end of said piston.

2. A control unit as claimed in claim 1 in which said piston includes a distal portion extending away from said head portion in the opposite direction to said proximal portion and in which said support stem also passes through said distal portion before exiting said piston.

3. A control unit as claimed in claim 2 in which said distal portion defines an inner confine of its associated chamber portion and passes through an end wall of a chamber.

4. A control unit as claimed in claim 1 in which said joint comprises a spherical joint.

5. A control unit as claimed in claim 1 in which said piston comprises a double acting piston and said head portion acts to divide a chamber into two chamber portions, each being operably connected to a source of hydraulic actuation fluid.

6. A control unit as claimed in claim 5 in which said proximal portion defines an inner confine of its associated chamber portion and passes through an end wall of said chamber.

7. A control unit as claimed in claim 1 and including an end-cap having a chamber therein into which said proximal portion extends during piston travel.

8. A control unit as claimed in claim 1 in which the unit comprises an assembly including a portion of a casing of the transmission in which said unit is installed.

9. A control unit as claimed in claim 8 in which an end-cap is attached to a casing.

10. A control unit as claimed in claim 8 in which said unit is provided in a hole through said casing.

11. A control unit as claimed in claim 1 in which said cylinder comprises a radially extending portion and an axially extending portion, said radially extending portion defining an end wall of a chamber and said axially extending portion defining a surface against which the head portion of said piston operates.

12. A control unit as claimed in claim 11 in which said cylinder comprises an annular channel for receiving hydraulic actuation fluid from a source thereof and a plurality of radially extending holes for directing said fluid to and from an hydraulic actuation chamber.

13. A control unit as claimed in claim 12 in which the cylinder further comprises a circumferentially extending step for engagement with a corresponding step on a casing portion and which between them act to locate the cylinder in a desired axial location.

14. A control unit as claimed in claim 12 in which the cylinder further includes a tip for engagement up against a face of an end-cap and the end-cap includes a circumferentially extending recess within the face for receiving actuation fluid passing around the tip and for directing it to or from an hydraulic chamber.

15. A control unit as claimed in claim 1 further including a roller attached to the support stem by a roller support.

16. An infinitely-variable-ratio transmission having a control unit as claimed in claim 1.

* * * * *